US010611182B2

(12) United States Patent
Weiss et al.

(10) Patent No.: US 10,611,182 B2
(45) Date of Patent: Apr. 7, 2020

(54) SYSTEM FOR SHIELDING PRINTER HEADS AND NOZZLES FROM CURING RADIATION

(71) Applicant: Massivit 3D Printing Technologies LTD., Lod (IL)

(72) Inventors: Aharon Weiss, Mevo-Choron (IL); Yoav Miller, Rehovot (IL); Yoav Aboudi, Kiryat Ono (IL)

(73) Assignee: Massivit 3D Printing Technologies LTD., Lod (IL)

( * ) Notice: Subject to any disclaimer, the term of this patent is extended or adjusted under 35 U.S.C. 154(b) by 0 days.

(21) Appl. No.: 16/079,135

(22) PCT Filed: Feb. 20, 2017

(86) PCT No.: PCT/IL2017/050212
§ 371 (c)(1),
(2) Date: Aug. 23, 2018

(87) PCT Pub. No.: WO2017/149525
PCT Pub. Date: Sep. 8, 2017

(65) Prior Publication Data
US 2019/0047309 A1    Feb. 14, 2019

Related U.S. Application Data

(60) Provisional application No. 62/302,193, filed on Mar. 2, 2016.

(51) Int. Cl.
*B41M 7/00* (2006.01)
*B41J 2/17* (2006.01)
*B05B 15/50* (2018.01)
*B33Y 30/00* (2015.01)

(52) U.S. Cl.
CPC ............. *B41M 7/009* (2013.01); *B05B 15/50* (2018.02); *B41J 2/1714* (2013.01); *B33Y 30/00* (2014.12)

(58) Field of Classification Search
CPC .... B41M 7/009; B41M 7/0081; B41J 2/1714; B41J 11/002; B05B 15/50; B33Y 30/00
USPC .................................................. 347/101, 102
See application file for complete search history.

(56) References Cited

U.S. PATENT DOCUMENTS

| 3,590,495 | A | 7/1971 | Tyson et al. |
| 4,094,492 | A | 6/1978 | Beeman et al. |
| 5,625,435 | A | 4/1997 | Lo et al. |
| 6,543,890 | B1 | 4/2003 | Ylitalo et al. |
| 2003/0011670 | A1 | 1/2003 | Shirakawa |
| 2008/0121172 | A1 | 5/2008 | Kritchman et al. |

OTHER PUBLICATIONS

International Search Report in PCT/IL2017/050212 dated Jul. 18, 2017.

*Primary Examiner* — An H Do
(74) *Attorney, Agent, or Firm* — Manelli Selter PLLC; Edward Stemberger

(57) ABSTRACT

Various shielding systems to shield printer heads, extrusion nozzles and extrusion nozzle openings from direct or reflected impingement thereupon of curing radiation so that to prevent undesired inadvertent curing of material residues adhered to the external surface of the printer extrusion nozzle and/or inside the nozzle opening forming cured residues that may compromise the accuracy of the printing process.

7 Claims, 9 Drawing Sheets

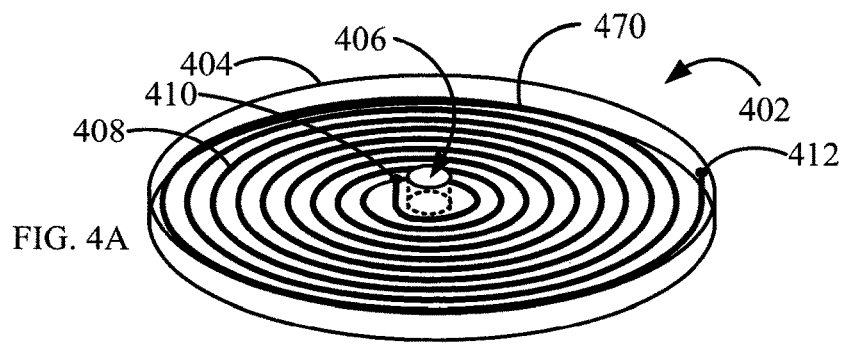
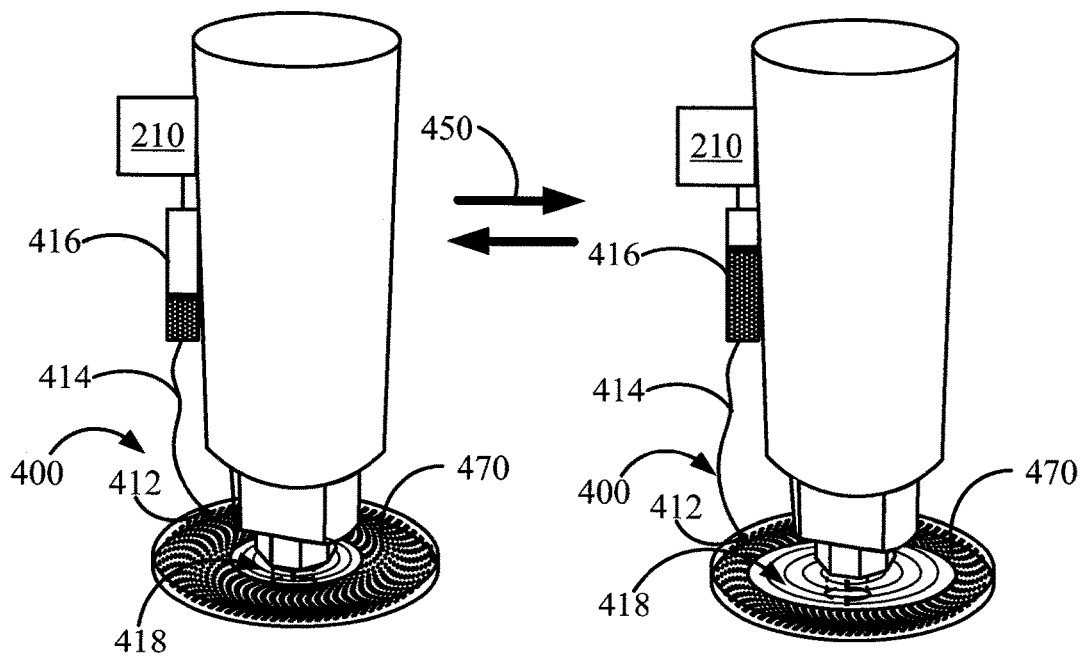
FIG. 4C    FIG. 4B
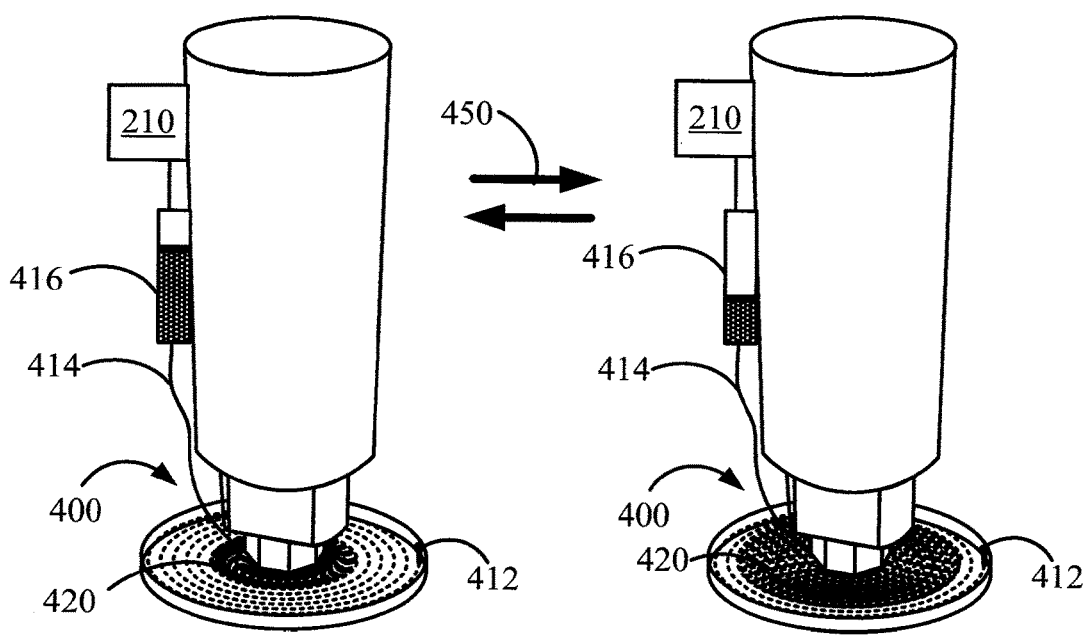
FIG. 4D    FIG. 4E

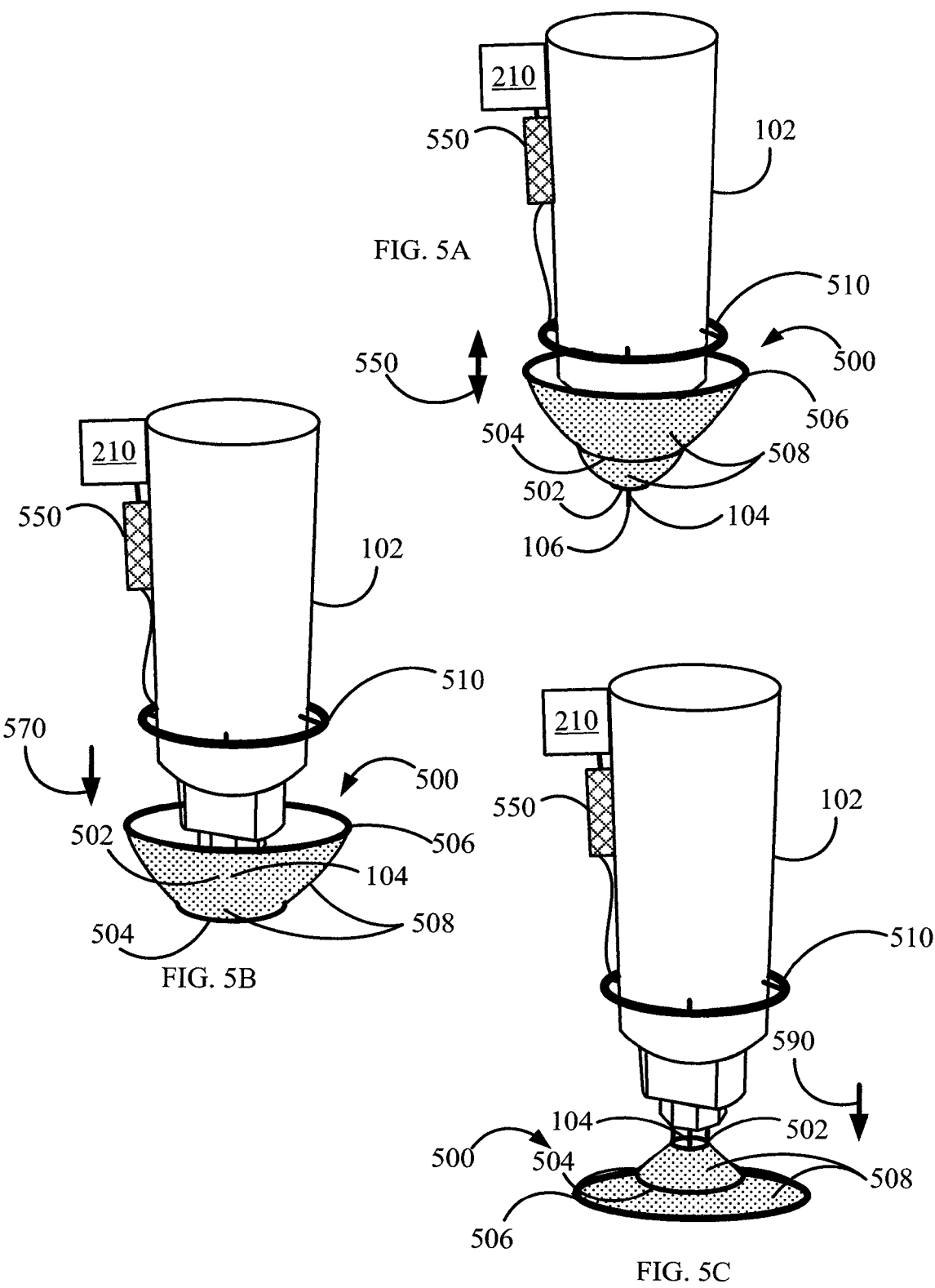

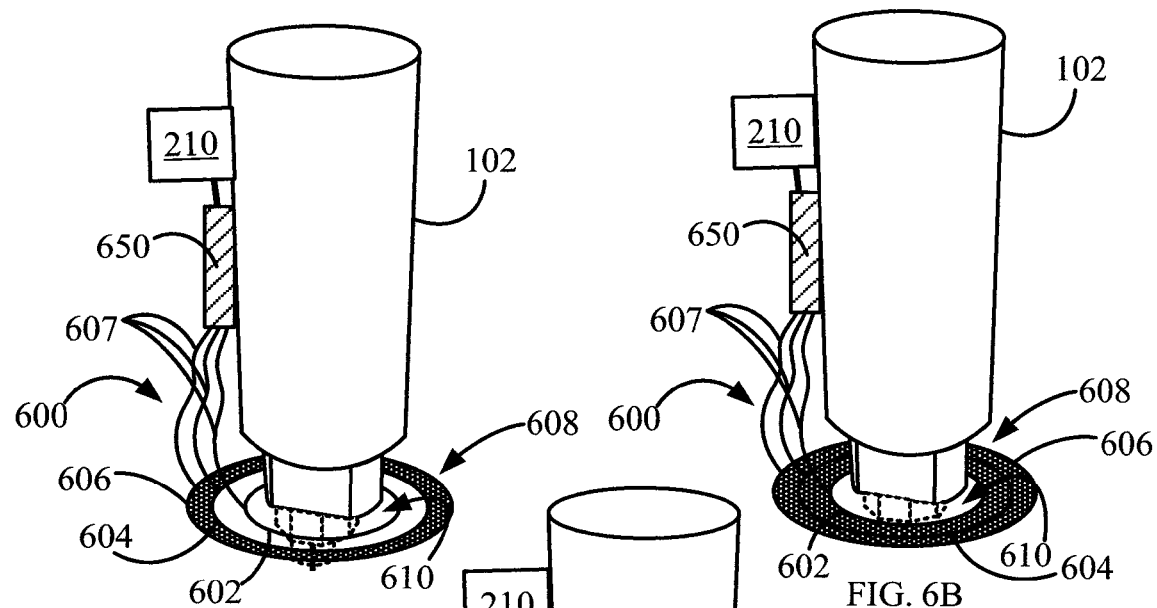
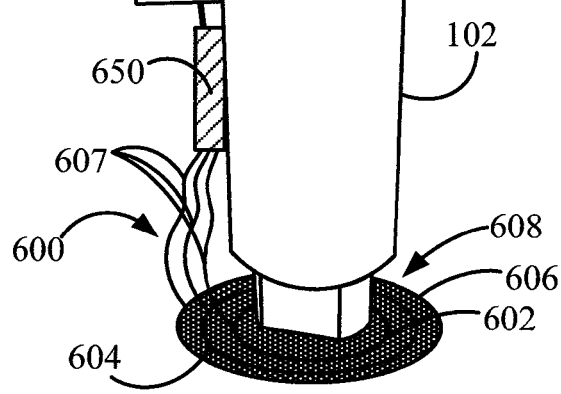
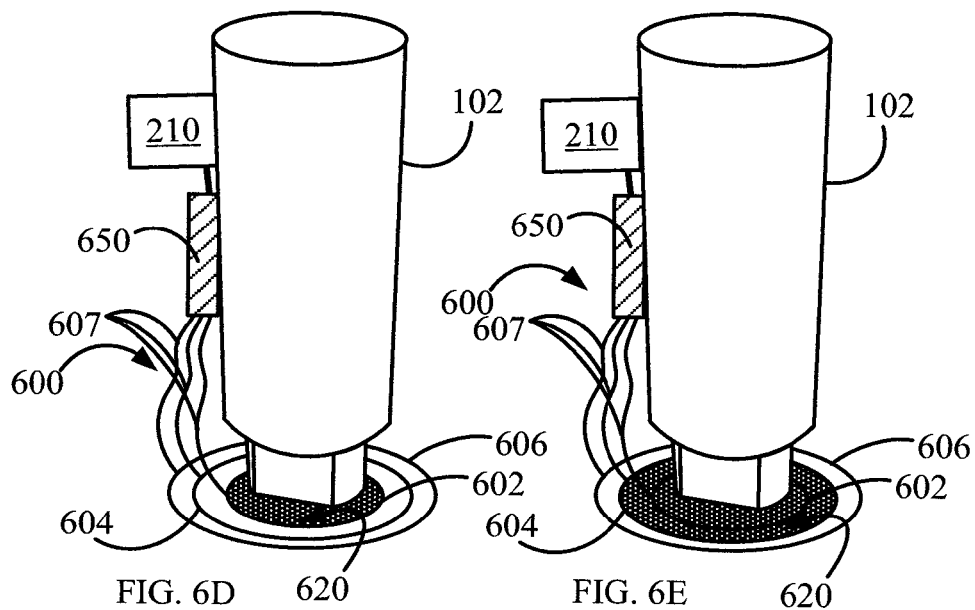

SYSTEM FOR SHIELDING PRINTER HEADS AND NOZZLES FROM CURING RADIATION

FIELD OF TECHNOLOGY

The apparatus and method are related to the field of additive manufacturing and particularly to curing of curable material layers deposited by additive manufacturing devices.

BACKGROUND

Three dimensional objects manufacturing processes involve deposition of a curable material layer in an imagewise manner and curing or hardening of the deposited segments of the layer. The layers are deposited (added) on top of each other and hence the process is called an additive manufacturing process by means of which a computer generated 3D model is converted into a physical object. The process involves generation of a plurality of material layers laid down or deposited on top (or bottom) of each of the preceding layer until the amount of accumulated layers results in a desired three dimensional physical object.

The material from which the layers of the three-dimensional physical object are generated could come in liquid, paste, powder, gel and other form. Conversion of such materials into a solid form is typically performed by suitable actinic radiation or heat. Different manufacturing techniques such as inkjet printing, laser sintering, material extrusion and others are used for manufacture of 3D objects.

Manufacturing of 3D objects spans over a large range of applications. This includes prototype manufacture, small runs of different products manufacture, decorations, sculptures, architectural models and other physical objects.

One of the common sources of curing radiation are Ultraviolet (UV) light sources. The time required to build a three-dimensional object depends on various parameters such as for example, curing time of the material using UV radiation, the speed of adding solid or liquid material to the layer which depends on the material itself, layer thickness, the intensity of the curing agent and the desired resolution of the three-dimensional object details and others.

Material extrusion supports manufacture of 3D objects and the curing of the extruded material could be performed in local or regional curing mode. However, since the extrusion nozzle is relatively close to the material deposited on the topmost layer of the model being deposited, curing radiation, such as UV radiation, aimed at curing the extruded layer reaches the nozzle as well, curing any material residues adhered to the external surface of the nozzle and/or inside the nozzle opening forming cured residues that may compromise the accuracy of the printing process by bringing about dislocation or deviation of the deposited material or full or partial blocking of the nozzle opening, which may bring about deposition of less material than required or gaps in material deposition.

Protecting the nozzle from curing UV radiation may prevent accumulation of cured residues around or inside the nozzle opening and allow smooth and accurate printing.

SUMMARY

Providing various shielding systems to shield printer heads, extrusion nozzles and extrusion nozzle openings from direct or reflected impingement thereupon of curing radiation so that to prevent undesired inadvertent curing of material residues adhered to the external surface of the printer extrusion nozzle and/or inside the nozzle opening forming cured residues that may compromise the accuracy of the printing process.

In one example, a shield can be an adjustable mechanical shutter the aperture of which adjusted by a controller in communication therewith in accordance with various parameters such as for example, curing time of the material using UV radiation, the speed of adding solid or liquid material to the layer which depends on the material itself, layer thickness, the intensity of the curing agent and the desired resolution of the three-dimensional object details and others.

In another example, a curing UV radiation shielding system can include a shield having a non-mechanically adjustable aperture and may be itself manufactured by an additive manufacturing process contributing to its low manufacturing cost, long durability, low wear and maintenance and simplicity of operation. A Transparent disc is provided that can accommodate a spiral capillary tube operative to connect to a UV absorbing or blocking fluid feeding tube and be variably filled with UV absorbing or blocking fluid as determined by a controller.

In yet another example, a curing UV radiation shielding system is provided that can include a series of frames of different sizes, attached to each other by a UV radiation blocking membrane, the largest being made of a ferromagnetic metal or composite, or a rare earth alloy such as samarium-cobalt or neodymium, and suspended in space at a point of equilibrium between the forces of gravity of earth and the magnetic forces of attraction developed between the frame and a variable size field electromagnet attached to the printer head and controlled by a controller.

In still another example, there is provided a curing UV radiation shielding system including a voltage generator in communication with and controlled by a controller and a series of one or more frames made of a transparent material having an adjustable UV radiation blocking or absorbing tint responsive to variable voltage, arranged concentrically about the longitudinal axis of the printer head and nozzle and on a plane perpendicular thereto and attached to each other to form a disc.

BRIEF DESCRIPTION OF THE DRAWINGS

In order to understand the apparatus and method and to see how it may be carried out in practice, examples will now be described, by way of non-limiting example only, with reference to the accompanying drawings, in which:

FIGS. 4A, 4B, 4C, 4D, 4E, 4F, 4G, 4H and 4I are perspective view and partial diagram simplified illustrations of a curing UV radiation shielding system in accordance with still another example;

FIGS. 5A, 5B, 5C, 5D and 5E are perspective view and partial diagram simplified illustrations of a curing UV radiation shielding system in accordance with another example; and FIGS. 6A, 6B, 6C, 6D, 6E, 6F, 6G and 6H are perspective view and partial diagram simplified illustrations of a curing UV radiation shielding system in accordance with yet another example.

DETAILED DESCRIPTION

The following disclosure relates to 3D printing or additive manufacturing and UV radiation curing. However, it will be appreciated by persons skilled in the art that the below described systems and methods can be implemented in any similar curing system such as UV light, LED systems, in vector or raster printing or otherwise used in curing processes such as curing and drying of inks, adhesives and coatings and screen printing processes by various industries such as medicine, automobiles, cosmetics, food, science, education and art.

The term "Disc" as used in this disclosure relates to a two or three-dimensional structure that supports accommodation of sheet segments of material or capillary tubes and can be flat-shaped, cone-shaped, dome-shaped, round, square, triangular, hexagonal or have any other suitable geometry.

The term UV radiation as used in this disclosure is brought forth as a specific, non-limiting example, representative of any type of curing radiation such as Ultraviolet (UV) radiation, Infrared (IR) radiation and others.

Figure 1:
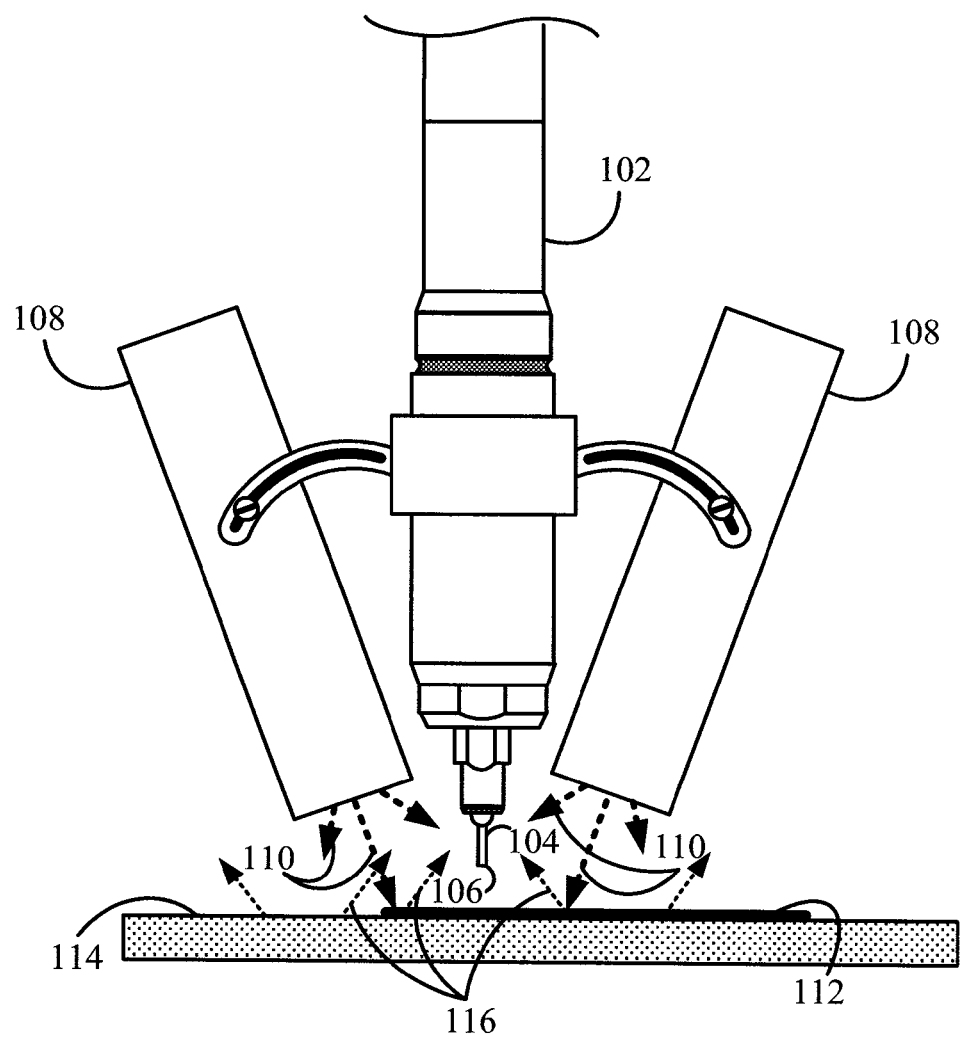
FIG. 1 is a schematic simplified cross-section illustration of an example of a printer head and UV radiation curing source suitable for manufacture by additive printing of three-dimensional structures.

Reference is made to FIG. 1 which is a schematic simplified cross-section illustration of an example of a printer head and UV radiation curing source suitable for manufacture by additive printing of three-dimensional structures such as that described in U.S. Provisional Patent Application No. 62/110,616 of the same assignee. Printer head 102 may include an extrusion nozzle 104 having an opening 106 and at least one source 108 of curing electromagnetic energy such as, for example, UV radiation 110. Printer head 102 extrusion nozzle can extrude a material layer 112 on a printing support surface 114.

Since extrusion nozzle 104 is relatively close to extruded material 110 deposited on the topmost layer of the model being deposited, curing radiation 108, such as UV radiation, aimed at curing the extruded layer reaches nozzle 104 as well, curing any material residues adhered to the external surface of nozzle 104 and/or inside the nozzle 104 opening 106 forming cured residues that may compromise the accuracy of the printing process by bringing about dislocation of the deposited material or full or partial blocking of nozzle 104 opening 106, which may bring about deposition of less material than required or gaps in material deposition. Protecting nozzle 104 from curing UV radiation may prevent accumulation of cured residues around or inside the nozzle 104 opening 106.

Protecting nozzle 104 from curing UV radiation (e.g., by applying a radiation shield) may cast a shadow on the deposited material blocking curing radiation and preventing the material from curing causing the extruded layer to flop or collapse. At high printing speeds (i.e., rapid translation of printer head 102) the period of time between the extrusion and placement of the material layer and application of the UV curing radiation is short so that the occurrence of such mishaps is limited. However, at low printing speeds the extruded material may require longer exposure time of the material to curing UV radiation to be hardened sufficiently. Hence, lack of this exposure by a shadow cast on the extruded material e.g., by a radiation shield, may bring about drop and collapse of extruded layers and failure of the printing.

UV radiation may impinge on nozzle 104 from two major sources, the primary source being curing energy source 108 radiating UV radiation energy 110 generally from above nozzle 104 in a direction towards printing support surface 114. The other, secondary source can be UV radiation reflecting off printing support surface 114 and in some cases material layer 112 in a direction away from support surface 114 towards nozzle 104 and nozzle opening 106.

Figure 2A:
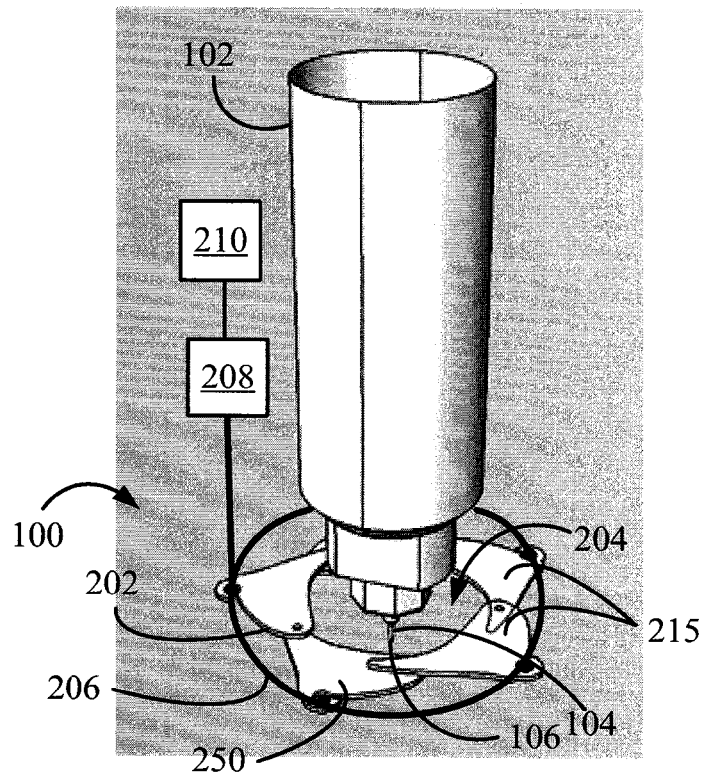
FIGS. 2A and 2B are perspective view and partial diagram simplified illustrations of a shielding system for a printer head in accordance with another example.
Figure 2B:
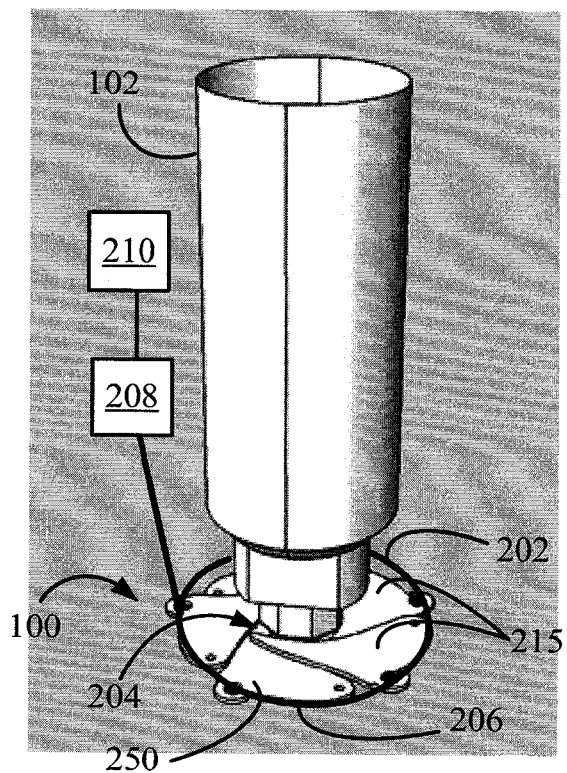

FIGS. 2A and 2B, collectively referred to as FIG. 2 are perspective view and partial diagram simplified illustrations of a shielding system 100 for a printer head. Fig. Shielding system 100 can include a mechanically adjustable curing UV radiation shield 202 in a form of an adjustable shutter 250, comprising several moveable overlapping leaves 215 mounted on printer head 102 forming an aperture 204 having an adjustable radius and protecting extrusion nozzle 104 from Curing UV radiation. Shield 202 may be operable to form of a centrally located variable diameter adjustable aperture 204 so that to provide a variable size shield shadowing nozzle 104 and nozzle opening 106 from UV radiation 110.

Curing UV radiation shield 202 may be attached to an adjustable shutter 250 opening and closing mechanism 206 driven by a driver 208, which in turn can be in communication with and controlled by a controller 210 and adjusts moveable overlapping leaves 215 to set the diameter of the aperture in accordance with varying above described printing parameters.

As explained above, the amount of curing UV radiation required to completely cure (i.e., harden) the extruded material layer can vary depending on several factors such as curing time of the material using UV radiation, the speed of adding solid or liquid material to the layer which depends on the material itself, layer thickness, the intensity of the curing agent and the desired resolution of the three-dimensional object details and others.

Hence, controller 210 can predetermine the radius of variable diameter adjustable aperture 204 or, alternatively, adjust the radius and rate of opening or closing of variable diameter adjustable aperture 204 during the printing process as required, for example, in accordance with a varying speed of printing. Controller 210 can continuously adjust the radius and rate of opening or closing of adjustable aperture 204 throughout and without stopping the printing process thus shortening the throughput time. FIG. 2A depicts variable diameter adjustable aperture 204 in an open position whereas FIG. 2B depicts adjustable aperture 204 in a closed position.

Figure 3A:
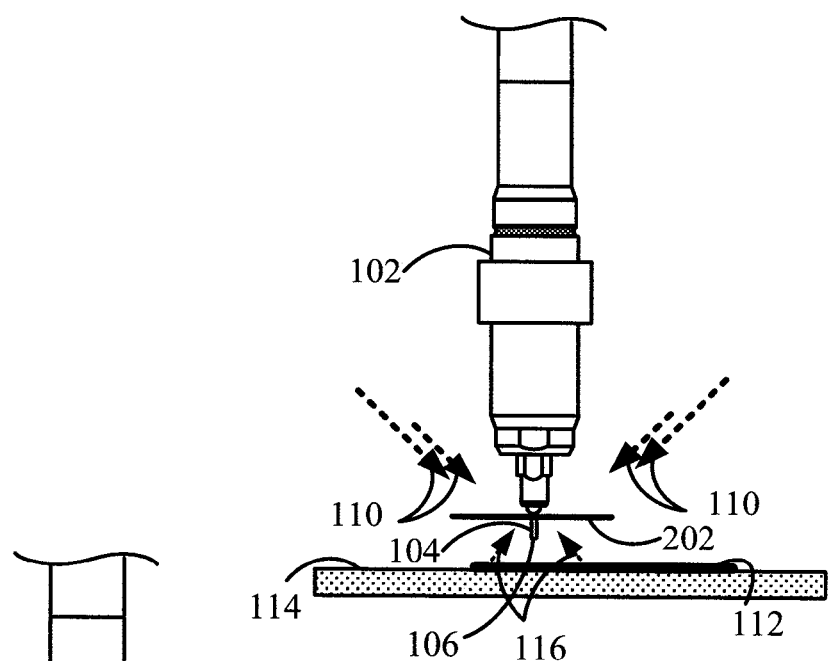
FIGS. 3A, 3B and 3C are cross-section view simplified illustrations of implementation of one or more UV radiation shields in accordance with yet another example.
Figure 3B:
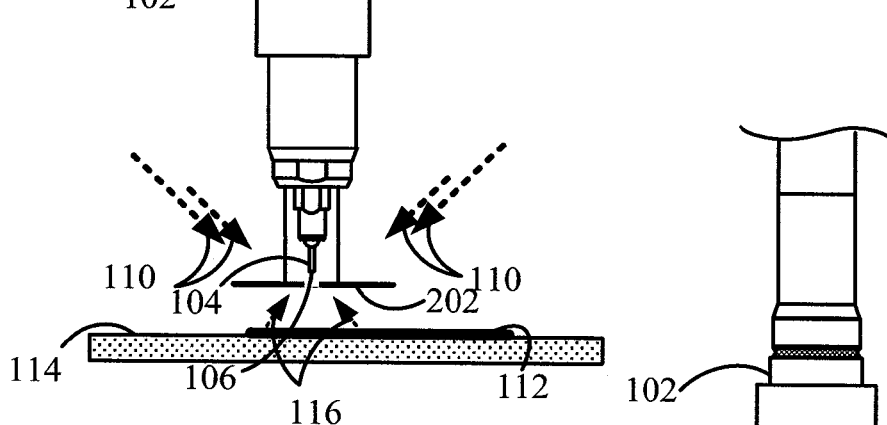
Figure 3C:
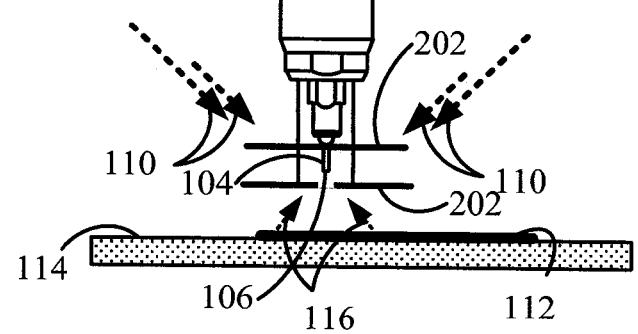

As shown in FIGS. 3A, 3B and 3C, collectively referred to as FIG. 3, which are examples of implementation of one or more UV radiation shields such as curing UV radiation shield 202 of FIG. 2, the primary source of UV radiation that can impinge on nozzle 104 is direct radiation 110 that originates from curing energy source 108 (FIG. 1), radiating generally from above nozzle 104 in a direction towards printing support surface 114. Protection from direct radiation 110 can be provided by placing curing UV radiation shield 202 above nozzle 104 and nozzle opening 106, e.g., at the attachment point of nozzle 104 to printer head 102 as shown in FIG. 3A.

In FIG. 3, driver 208 and controller 210 have been removed for purposes of simplification of the explanation only.

A secondary source of curing UV radiation impinging on nozzle 104 and nozzle opening 106 can be reflected radiation 116 being reflected off of printing support surface 114 and in some cases material layer 112 in a direction away from support surface 114 towards nozzle 104. In such cases, curing UV radiation shield 202 can be placed between nozzle 104 and nozzle opening 106 and material layer 112, for example, by suspension from printer head 102, as depicted in FIG. 3B.

FIG. 3C illustrates implementation of two curing UV radiation shields 202 so that to protect nozzle 104 and nozzle opening 106 from both direct radiation 110 and reflected radiation 116.

Figure 4F:
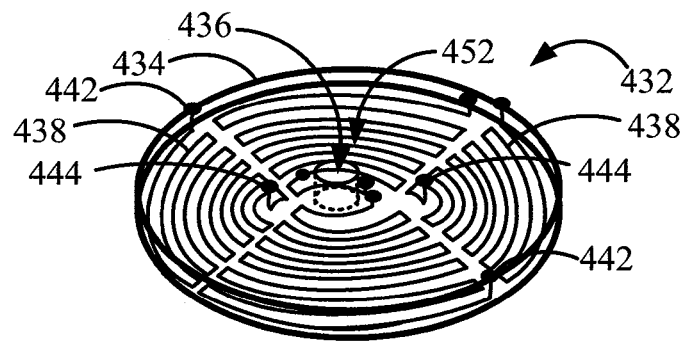

Reference is now made to FIGS. 4A, 4B, 4C, 4D, 4E, 4F, 4G, 4H and 4I collectively referred to as FIG. 4, which are perspective view simplified illustrations of another example of a curing UV radiation shielding system. As shown in FIG. 4A, system 400 can include a curing UV radiation shield 402 that can have a non-mechanical adjustable shutter 470. Curing UV radiation shield can comprise a transparent disc 404, having a central through-hole 406 operative to accommodate and attach to at least a portion of printer head 102 and/or extrusion nozzle 104 at any level as explained in reference to FIG. 3 above.

Transparent disc 404 can also house or support an adjustable shutter 470 comprising a spiral capillary tube 408 having a first central capillary opening 410 and a second peripheral capillary opening 412. Either capillary opening 410/412 can open to the atmosphere at any surface of disc 404. Any one of capillary openings 410/412 can be attached to an adaptor or connector (not shown) operative to connect to a UV absorbing or blocking fluid feeding tube 414 (FIGS. 4B-4E) so that when one capillary opening is connected to feeding tube 414, the other capillary opening can act as a breather and vice versa. The number of curve winds of spiral capillary tube 408 dictates the density of the UV absorbing or blocking fluid inside spiral capillary tube 40: the higher the number of winds—the greater the density. Hence, several curing UV radiation shield 402 discs 404 can be prepared at various densities (i.e., number of curved winds) as desired.

Curing UV radiation shielding system 400 can also include a bidirectional fluid driver 416 (FIGS. 4B-4E) operative to inject UV absorbing or blocking fluid into or draw out of spiral capillary tube 408 via feeding tube 414. Bidirectional fluid driver 416 can also be in communication with and controlled by controller 210.

FIGS. 4B-4E, demonstrate implementation of shielding system 400 for a printer head including adjustable Curing UV radiation shield 402 during the printing process. FIGS. 4B and 4C depict a non-mechanical adjustable shutter 470, whereas FIGS. 4D and 4E depict an adjustable radius UV radiation shield. In FIGS. 4B and 4C, peripheral capillary opening 412 is connected to UV absorbing or blocking fluid feeding tube 414 and central capillary opening 410 (Not shown) acts as a breather. In this configuration UV absorbing or blocking fluid injected via the feeding tube connected to the second peripheral capillary opening fills the peripheral shutter winds first forming a centrally located shutter 470 aperture 418.

In FIG. 4B, driver 416 has injected a small amount of UV absorbing or blocking fluid into spiral capillary tube 40 so that only a desired number of peripheral adjustable shutter 470 winds are filled with UV absorbing or blocking fluid. This creates an open adjustable aperture 418 similar to the open adjustable aperture of FIG. 2A. The volume of air replaced by the UV absorbing or blocking fluid can exit to the atmosphere via the breather, in this configuration central capillary opening 410.

In FIG. 4C, driver 416 has further injected an additional amount of UV absorbing or blocking fluid into spiral capillary tube 40 so that additional adjustable shutter 470 winds are filled with UV absorbing or blocking fluid. This brings about a decrease in diameter of adjustable aperture 418. The volume of air replaced by the UV absorbing or blocking fluid can exit to the atmosphere via the breather, in this configuration central capillary opening 410 (not shown). Additional UV absorbing or blocking fluid can be injected into spiral capillary tube 40 so that all adjustable shutter 470 winds of spiral capillary tube 40 are filled with UV absorbing or blocking fluid bringing about complete closure of adjustable aperture 418 (not shown) similar to the closed adjustable aperture of FIG. 2B.

The process described above can be bidirectional as indicated by arrows designated reference numeral 450. For example, the above described process can be reversed so that once spiral capillary tube 40 is completely filled with UV absorbing or blocking fluid bringing about complete closure of adjustable aperture 418, driver 416 can withdraw an amount of UV absorbing or blocking fluid determined by controller 210 out of spiral capillary tube 40 so that once again only peripheral winds are filled with UV absorbing or blocking fluid. This reopens adjustable aperture 418 as depicted in FIG. 4B. The volume of withdrawn UV absorbing or blocking fluid can be replaced by ambient air drawn into the breather, in this configuration central capillary opening 410, by the vacuum formed by the missing volume of fluid in spiral capillary tube 40.

The above described process of opening and closing adjustable shutter 470 aperture 418 can be carried out continuously throughout the printing process and controller 210 can continuously adjust the radius and rate of opening or closing of adjustable aperture 418 without stopping the printing process thus shortening the throughput time.

In FIGS. 4D and 4E, central capillary opening 410 (Not shown) is connected to UV absorbing or blocking fluid feeding tube 414 and peripheral capillary opening 412 acts as a breather. In this configuration UV absorbing or blocking fluid injected via the feeding tube connected to the first central capillary opening fills the central shutter winds first forming a shield 420.

In FIG. 4D, driver 416 has injected a small amount of UV absorbing or blocking fluid into spiral capillary tube 40 so that only a desired number of central adjustable shutter 470 winds are filled with UV absorbing or blocking fluid. This creates a small radius UV radiation shield 420. The volume of air replaced by the UV absorbing or blocking fluid can exit via the breather, in this configuration peripheral capillary opening 412.

In FIG. 4E, driver 416 has further injected an additional amount of UV absorbing or blocking fluid into spiral capillary tube 40 so that additional winds are filled with UV absorbing or blocking fluid. This brings about an increase in diameter of the radius of UV radiation shield 420. The volume of air replaced by the UV absorbing or blocking fluid can exit via the breather, in this configuration peripheral capillary opening 412. Additional UV absorbing or blocking fluid into spiral capillary tube 40 so that all winds of spiral capillary tube 40 are filled with the fluid creating a full-sized radius UV radiation shield 420.

The process described above can be bidirectional as indicated by arrows designated with reference numeral 450. Driver 416 can inject or withdraw an amount of UV absorbing or blocking fluid determined by controller 210 into or out of spiral capillary tube 40 to create any size radius UV radiation shield 420.

During the curing process, there may be a desire to produce differential curing of an object being printed and cure only sections such as, for example disposed directly under nozzle opening 106 and not cure other sections, such as sections ahead of nozzle opening 106, sections already cured or sections disposed on the either side of the section being cured. This can be achieved by adjustment of the aperture diameter or block UV radiation applied to or reflected from specific sections.

Considerations for differential curing may include a desire to adjust curing in accordance with speed of printing and the effect of the UV radiation on already cured sections, so that to allow for better uniformity of the object being printed.

Additional considerations can include adjustment of shutter aperture diameter or sectional blocks in accordance with UV radiance reflected off the object being printed or the floor. Shutter aperture diameter or sectional blocks can also be adjusted according to UV radiation reflected off nearby layers and the printing time between UV exposures.

FIG. 4F illustrates a curing UV radiation shielding system for selective curing in accordance with still another example in which system 400 can include a segmented curing UV radiation shield 432. Shield 432 can comprise a transparent disc 434, having a central through-hole 436 operative to accommodate and attach to at least a portion of printer head 102 and/or extrusion nozzle 104 at any level as explained in reference to FIG. 3 above.

Transparent disc 434 can house or support one or more non-mechanical adjustable serpentine capillary tube segments 438 disposed about central through-hole 436. Serpentine capillary tube segments 438 can operate in a fashion similar to spiral capillary tube 408 of FIG. 4A, having capillary openings 442/444 that can open to the atmosphere at any surface of disc 434. Any one of capillary openings 442/444 can be attached to an adaptor or connector (not shown) operative to connect to a UV absorbing or blocking fluid feeding tube 446 (FIGS. 4G-4I) so that when one capillary opening is connected to feeding tube 446, the other capillary opening can act as a breather and vice versa. The number of curved capillary bends of serpentine capillary tube segments 438 dictates the density of the UV absorbing or blocking fluid inside serpentine capillary tubes 438: the higher the number of capillary bends—the greater the density. Hence, several curing UV radiation shield 432 discs 434 can be prepared at various densities (i.e, number of curved capillary bends) as desired.

Figure 4G:
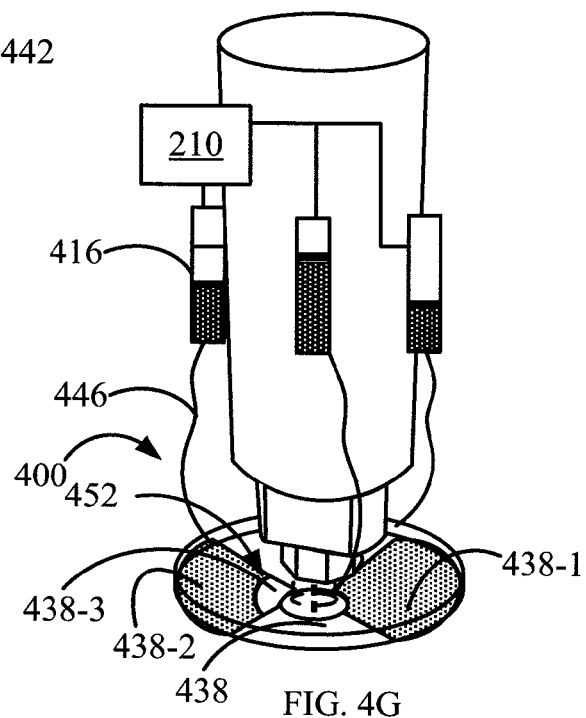
Figure 4H:
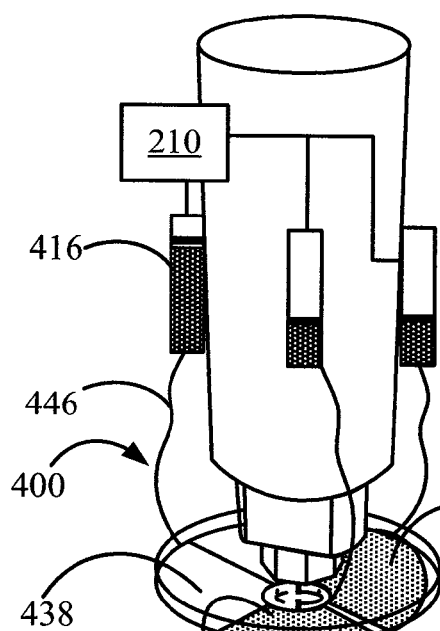
Figure 4I:
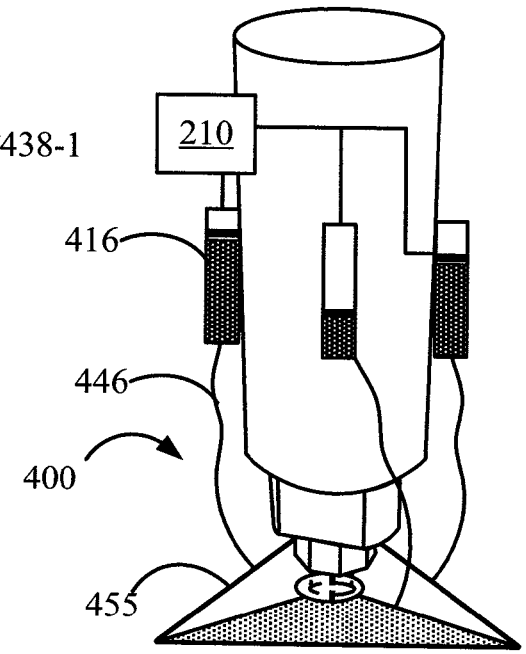

As shown in FIGS. 4G, 4H and 4I, each of serpentine capillary tube segments 438 can partially block UV radiation that may impinge on nozzle 104, as shown in FIG. 1, from curing energy source 108 radiating UV radiation energy 110 generally from above nozzle 104 in a direction towards printing support surface 114 or UV radiation reflecting off printing support surface 114 and in some cases material layer 112 in a direction away from support surface 114 towards nozzle 104 and nozzle opening 106.

Additionally and optionally, and as shown in FIG. 4G, each of serpentine capillary tube segments 438 can function in a similar fashion to shield 402, in that a segment 438 can have a non-mechanical sectional adjustable shutter 452. In FIGS. 4G and 4H the capillary bends of segments 438-1 are fully filled with UV absorbing or blocking fluid forming sectional, segmental blocking of UV radiation. Segments 438 are transparent allowing any type of radiation to pass therethrough.

In FIG. 4G, only a portion 438-2 of serpentine capillary tube segment 438 is filled with the UV absorbing or blocking fluid, leaving portion 438-3 transparent, hence not only creating a sectional, segmental block of UV radiation but forming a non-mechanical sectional adjustable aperture 452 as well. FIG. 4I depicts UV shielding system 400 in which UV radiation shield 455 is triangular in geometry.

Activation of specific serpentine capillary tube segments 438 can be in accordance with a pre-determined protocol or determined as required "on-the-fly" by controller 210.

The above described process of increasing or decreasing the radius of UV radiation shield 420 can be carried out continuously throughout the printing process and controller 210 can continuously adjust the radius and rate of increasing or decreasing the radius of UV radiation shield 420 without stopping the printing process thus shortening the throughput time.

Curing UV radiation shield 402 does not include any mechanical moving parts and may be itself manufactured by an additive manufacturing process contributing to its low manufacturing cost, long durability, low wear and maintenance and simplicity of operation.

Reference is now made to FIGS. 5A, 5B and 5C collectively referred to as FIG. 5, which are perspective view simplified illustrations of still another example of a curing UV radiation shielding system. As shown in FIG. 5A, system 500 can include a voltage generator 550 in communication with and controlled by controller 210 and electrically connected to a fixed ring or partial ring 510, rigidly attached to and at least partially surrounding printer head 102. In operation, voltage generator 550 can induce an electromagnetic field about ring 510.

System 500 can also include a series of two or more frames 502, 504 and 506 being of different sizes and arranged in a concentric fashion about the central axis of printer head 102 and nozzle 104, from the smallest frame 502 to the largest frame 506. Frames 502 through 506 can be of any geometry. In the instant example frames 502 through 506 are ring-shaped having varying radii.

At least a portion of the circumference of each ring can be attached to one border of a membrane 508 of UV radiation blocking flexible material the other border of which can be attached to at least a portion of the circumference of an adjacent ring.

It will be appreciated by persons skilled in the art that UV radiation shielding system 500 can include any number of frames or rings and that three rings are disclosed herein for example purposes only.

Innermost, smallest ring 502 can be rigidly attached to, or suspended from printer head 102. Outermost, largest ring 506 can be a floating ring attached by UV radiation blocking membrane 508 to adjacent ring 504 and can be made of a ferromagnetic metal or composite, or a rare earth alloy such as samarium-cobalt or neodymium. Thus, when an electromagnetic field is generated about ring 510 by voltage generator 550, floating ring 506 can be held suspended in space at a point of equilibrium between the forces of gravity of earth and the attraction forces developed between ring 506 and the electromagnetic field about ring 510. Ring 504 can rest in a suspended state between adjacent floating ring 506 on one side and fixed ring 502 on the other side, attached only to both adjacent rings 502 and 506 via UV radiation blocking membrane 508. All other rings can be made of a non-magnetic material such as plastic, aluminum and other antiferromagnetic materials.

Adjusting the voltage supplied by voltage generator 550 to ring 510 can increase or decrease the magnitude of the electromagnetic field about ring 510 thus increasing or decreasing the magnetic forces of attraction between floating ring 506 and the electromagnetic field about ring 510, causing floating ring 506 to slide up and down, with or against the forces of gravity along and suspensionally (without contacting printer head 102) the longitudinal axis of printer head 102.

In operation, controller 210 can adjust the magnitude of the electromagnetic field about ring 510 as necessary to lower and raise floating ring 506. When floating ring 506 is partially lowered in a direction indicated by an arrow designated reference numeral 570, tension is relaxed on UV radiation blocking membrane 508 bringing about lowering of ring 504 as well, which becomes suspended below floating membrane 506, shadowing and shielding nozzle 104 from curing UV radiation as illustrated in FIG. 5B.

Should the printing conditions dictate the need for a larger UV radiation blocking shield, controller 210 can further decrease the electromagnetic field about ring 510, further weakening the magnetic forces of attraction between floating ring 506 and the electromagnetic field about ring 510 and bringing about further lowering of floating ring 506 in a direction indicated by an arrow designated reference numeral 590, to come to rest in a suspended state below ring 504, further increasing the radius of the UV radiation blocking shield to a full radius of UV radiation blocking membrane 508 suspended between floating ring 506 and ring 504, and between ring 504 and ring 502. The lower the position of the floating frame 506, the larger the radius of the shield shadowing printer head 102 and nozzle 104 from direct curing radiation 110.

Figure 5D:
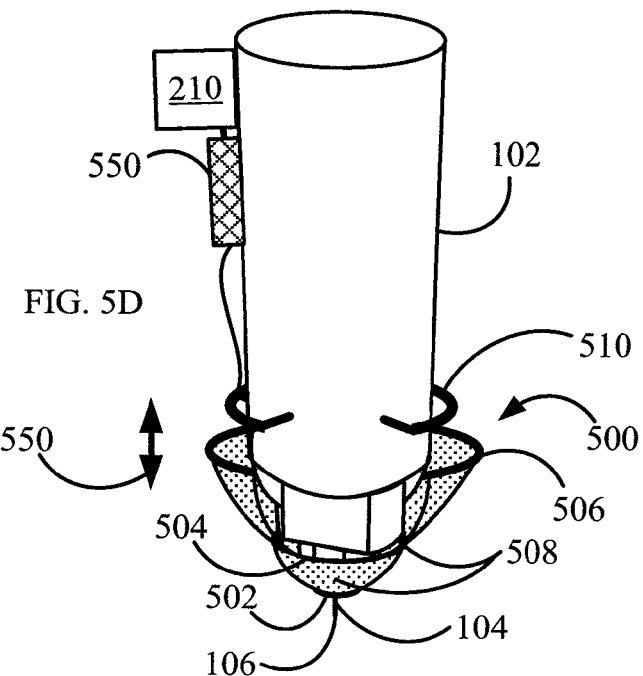
Figure 5E:
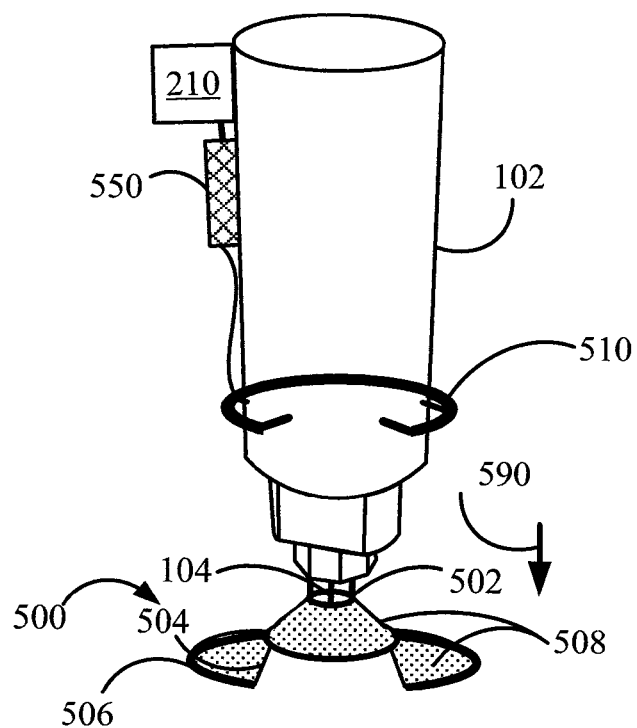

The process described above can be bidirectional as indicated by a double-headed arrow designated reference numeral 550 and carried out continuously throughout the printing process. Controller 210 can continuously adjust the magnitude of the electromagnetic field about ring 510, thus lowering or raising floating ring 506 without stopping the printing process thus shortening the throughput time. FIGS. 5D and 5E depict a segmented configuration of UV radiation shielding system 500 in a closed position (FIG. 5D) and an open configuration (FIG. 5E).

Figures 6F, 6G:
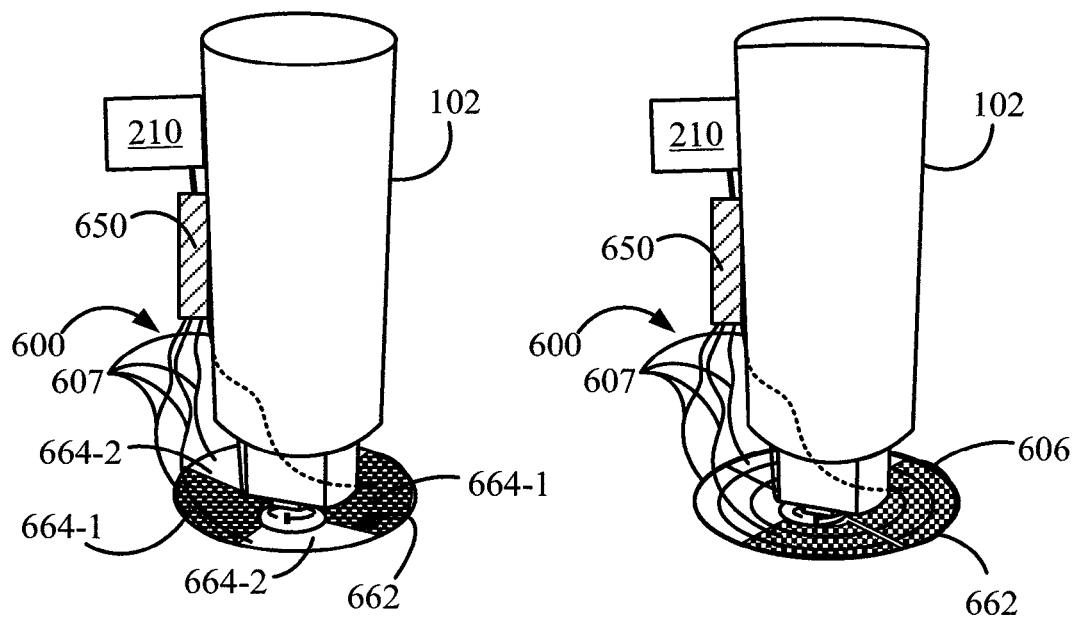
Figure 6H:
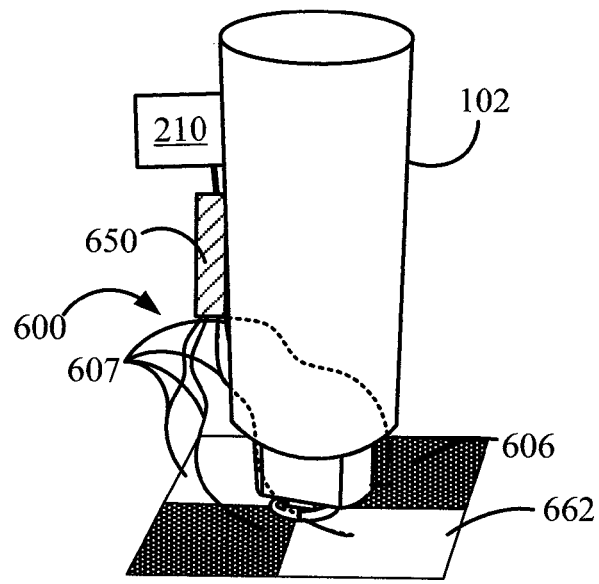

FIGS. 6A, 6B, 6C, 6D, 6D, 6E, 6F, 6G and 6H, together referred to as FIG. 6, are perspective view simplified illustrations of yet another example of a curing UV radiation shielding system. FIGS. 6A through 6C depict a non-mechanical adjustable shutter 608, whereas FIGS. 6D and 6E depict an adjustable radius UV radiation shield.

System 600 can include a voltage generator 650 in communication with and controlled by controller 210 and a series of two or more concentric frames 602, 604 and 606 via electrical conductors 607. In an example depicted in FIG. 6, frames 602, 604 and 606 are in a form of a ring. However, frames 602, 604 and 606 can have any applicable geometric form such as squares, triangles, hexagons and similar.

Rings 602, 604 and 606 shown in FIG. 6 can be made of a transparent material having an adjustable UV radiation blocking or absorbing tint responsive to variable voltage such as voltage responsive polymer dispersed liquid crystal devices (PDLCs), electrochromic material or similar, arranged concentrically about the longitudinal axis of the printer head and nozzle adjacent to each other to form adjustable shutter 608.

In FIGS. 6A through 6C and for example purposes only, adjustable shutter 608 is disc-shaped. Adjustable shutter 608 can be rigidly attached to printer head 102 at any level as explained in reference to FIG. 3 above. Rings 602-606 can be flat or have any desirable geometric cross section. In the instant example, rings 602-606 are flat for example purposes only.

Rings 602, 604 and 606 can be electrically isolated from each other, each ring individually electrically connected to voltage generator 650, so that when voltage is applied to one or more rings 602, 604 and/or 606 an electrically activated ring can change its opacity or density of tint between a state of opacity to UV radiation and a transparent state through various stages of translucency in between depending on the voltage applied. It will be appreciated by persons skilled in the art that UV radiation shielding system 600 can include any number of rings and that three rings are disclosed herein for example purposes only.

FIGS. 6A to 6C, illustrate various states of disc opacity creating a variable diameter non-mechanical adjustable aperture 610. In FIG. 6A, controller 210 electrically activates only the most peripheral ring 606 via voltage generator 650. This creates an open adjustable shutter 608 aperture 610, similar to open adjustable shutter 470 apertures 418 of FIG. 4B and 204 of FIG. 2A. In FIG. 6B, controller 210 electrically activates both most peripheral ring 606 and intermediate ring 604 thus decreasing the radius (i.e., closing) of adjustable shutter 608 aperture 610 a state similar to that of aperture 418 of FIG. 4C. FIG. 6C illustrates voltage applied to all rings 602, 604 and 606 of adjustable shutter 608 bringing about complete closure of adjustable shutter 608, a state similar to that of adjustable shutter aperture 204 of FIG. 2B.

Controller 210 can predetermine the radius of variable diameter adjustable aperture 610 or, alternatively, adjust the radius and rate of opening or closing of variable diameter adjustable aperture 610 during the printing process as required, for example, in accordance with a varying speed of printing.

Similarly, as shown in FIG. 6D, controller 210 can apply voltage via voltage generator 650 to innermost ring 602 only to create a small-radius curing UV radiation shield 620 similar to curing UV radiation shield 420 depicted in FIG. 4D. In FIG. 6E, controller 210 can apply voltage via voltage generator 650 to both innermost ring 602 and intermediate ring 604 to create a curing UV radiation shield 620 having a radius larger than that depicted in FIG. 6D, similar to curing UV radiation shield 420 depicted in FIG. 4E.

Curing UV radiation shield 608 does not include any mechanically moveable parts and may be itself manufactured by an additive manufacturing process contributing to its low manufacturing cost, long durability, low wear and maintenance and simplicity of operation.

Controller 210 can continuously adjust the radius and rate of increasing and decreasing in size of curing UV radiation shield 620, throughout and without stopping the printing process thus shortening the throughput time.

As shown in FIGS. 6F-6H, a segmented Curing UV radiation shield 662 can be made of one or more sheet segments of a transparent material having an adjustable UV radiation blocking or absorbing tint responsive to variable voltage such as voltage responsive polymer dispersed liquid crystal devices (PDLCs), electrochromic material or similar, arranged concentrically about the longitudinal axis of the printer head and nozzle and form adjustable shutter 608.

As shown in FIG. 6F, for selective curing the transparency of each segment 664 can individually controlled by controller 210 via voltage generator 650. In FIG. 6F, voltage across the segments 664-1 has been adjusted to minimize transparency therethrough, whereas segments 604-2 remain transparent.

FIG. 6G demonstrates a combination of a segmented Curing UV radiation shield 662, similar to that shown in FIG. 6F and adjustable shutter 608 shown in FIGS. 6A-6E. This configuration therefore supports not only creating a sectional, segmental block of UV radiation but forming a non-mechanical sectional adjustable aperture 610 as well.

FIG. 6H depicts UV shielding system 600 in which UV radiation shield 662 is square in geometry.

It will also be appreciated by persons skilled in the art that the present disclosure is not limited to what has been particularly shown and described hereinabove. Rather, the scope of the method and apparatus includes both combinations and sub-combinations of various features described hereinabove as well as modifications and variations thereof which would occur to a person skilled in the art upon reading the foregoing description and which are not in the prior art.

The invention claimed is:

1. Curing radiation shielding system for printer heads and nozzles, comprising:
   a printer head;
   at least one nozzle;
   at least one shutter mounted on the printer head having an adjustable aperture; and
   an aperture opening and closing mechanism driven by a driver,
   wherein the shutter is constructed and arranged to shield the at least one nozzle from impinging curing radiation directed towards a printing support surface and from radiation reflecting off the printing support surface.

2. The system of claim 1, wherein the shutter further comprises at least two moveable overlapping leaves mounted on the printer head, and wherein the leaves form the aperture.

3. The system of claim 2, wherein the driver is in communication with and controlled by a controller that adjusts the leaves to set a diameter of the aperture in accordance with varying printing parameters.

4. The system of claim 1, wherein the driver is in communication with and controlled by a controller that adjusts a diameter of the aperture in accordance with varying printing parameters.

5. The system of claim 4, wherein the printing parameters include at least one of curing time of material using UV radiation, speed of adding solid or liquid material to a layer, layer thickness, intensity of a curing agent and desired resolution of a three-dimensional object details.

6. The system according to claim 1, wherein a controller continuously adjusts a radius and rate of opening or closing of the adjustable aperture throughout and without stopping a printing process thus shortening a throughput time.

7. Curing radiation shielding system for printer heads and nozzles, comprising:
   a movable printer head;
   at least one nozzle;
   at least one shutter mounted on the printer head and movable therewith, the at least one shutter having an adjustable aperture; and
   an aperture opening and closing mechanism driven by a driver,
   wherein the shutter is constructed and arranged to shield the at least one nozzle from impinging curing radiation.

* * * * *